US012729001B2

(12) United States Patent
Cloet et al.

(10) Patent No.: US 12,729,001 B2
(45) Date of Patent: Sep. 8, 2026

(54) CONVERTIBLE AIRCRAFT SOFA WITH BACKREST THAT CAN FIT BENEATH A GIVEN HEIGHT

(71) Applicant: AIRBUS ATLANTIC, Rochefort (FR)

(72) Inventors: Frédéric Cloet, Rochefort (FR); Mark Collins, Collex-Bossy (CH); Alexandra Collins, Collex-Bossy (CH); Jean-Baptiste Bruyère, Collex-Bossy (CH)

(73) Assignee: AIRBUS ATLANTIC, Rochefort (FR)

( * ) Notice: Subject to any disclaimer, the term of this patent is extended or adjusted under 35 U.S.C. 154(b) by 0 days.

(21) Appl. No.: 19/075,968

(22) Filed: Mar. 11, 2025

(65) Prior Publication Data

US 2025/0289573 A1 Sep. 18, 2025

(51) Int. Cl.
*B64D 11/06* (2006.01)

(52) U.S. Cl.
CPC ...... *B64D 11/0641* (2014.12); *B64D 11/0601* (2014.12); *B64D 11/0606* (2014.12)

(58) Field of Classification Search
CPC .. B64D 11/0641; B64D 11/0606; B60N 2/34; A47C 17/16; A47C 17/1753
See application file for complete search history.

(56) References Cited

U.S. PATENT DOCUMENTS

| | | | | |
|---|---|---|---|---|
| 4,321,716 A * | 3/1982 | Shrock | ............... | A47C 17/1756 5/47 |
| 2016/0052633 A1 | 2/2016 | Lawson et al. | | |
| 2016/0325838 A1* | 11/2016 | Erhel | ....................... | B60N 2/34 |

FOREIGN PATENT DOCUMENTS

| | | | |
|---|---|---|---|
| DE | 102010054090 | 7/2011 | |
| FR | 2894796 | 6/2007 | |
| FR | 3095190 | 4/2019 | |
| GB | 911097 | 11/1962 | |
| GB | 911097 A * | 11/1962 | ......... A47C 17/1756 |
| WO | 9637378 | 11/1996 | |
| WO | WO-2021074686 A1 * | 4/2021 | ......... B64D 11/0605 |

OTHER PUBLICATIONS

Preliminary Search Report for FR2402437, dated Sep. 9, 2024.

* cited by examiner

*Primary Examiner* — Ashesh Dangol
(74) *Attorney, Agent, or Firm* — Perman & Green, LLP

(57) ABSTRACT

A sofa for a passenger transport vehicle such as an aircraft, including a seat section, a backrest and a structure supporting them, the sofa being convertible into at least two positions each having a total usable surface area by the passenger: a sitting position where the backrest is upright with respect to the seat section, and a reclining position where the backrest is folded down in the same plane with respect to the seat section. The seat having a sufficient length to allow a passenger in the sitting position to fully extend their legs. In the sitting position, the backrest is partially stored beneath the seat section in a space of the structure, such that the total usable surface area in the sitting position is less than the total usable surface area in the reclining position.

7 Claims, 8 Drawing Sheets

10
25
30
11
12

10
25
30
E
11
12
B
DETAIL B 10
30
25
12
11
C
DETAIL C
131

CONVERTIBLE AIRCRAFT SOFA WITH BACKREST THAT CAN FIT BENEATH A GIVEN HEIGHT

CROSS-REFERENCE TO RELATED APPLICATIONS

This application is based on and claims priority under 35 U.S.C. § 119 to French Patent Application No. FR2402437, filed on Mar. 12, 2024, in the French Intellectual Property Office, the disclosure of which is incorporated by reference herein in its entirety.

BACKGROUND

Field

The present disclosure belongs to the field of fitting out cabins of passenger transport vehicles, in particular aircraft, and relates more particularly to an aircraft sofa convertible into a bed and including a backrest that can fit beneath a set given height.

The disclosure has a direct, but not exclusive, application in fitting out higher class (business class or first class) airliner cabins.

BRIEF DESCRIPTION OF RELATED DEVELOPMENTS

In air transport, the comfort level required in higher airliner classes (business class and first class) must offer passengers the option of lying down in a comfortable, in particular reclining, position, especially when the flight time is long, and of enjoying some privacy in relation to other passengers.

To meet this need, airlines incorporate chairs convertible into beds. These chairs have been known for a long time and exist in numerous designs.

However, arranging convertible chairs can sometimes involve constraints related to the surroundings of the chair, the use of the space available and the desired comfort level.

Indeed, it sometimes arises that the convertible chairs are placed in individual compartments, also known as passenger suites, with other amenities, or even extra seat units, with which the main chair must be able to cooperate in its different positions while complying with dimensional constraints. In particular, the chair must be able to offer a maximum reclining surface area in the bed position while allowing optimal accessibility to the other amenities regardless of its position.

For the most luxurious first classes, airlines supplement their offerings by adjusting the space allotted to the passenger so as to include as many ancillary entertainment services therein as possible, and/or by extending this space to reduce the isolating effect and/or to be able to arrange other additional pieces of furniture therein, such as benches, consoles that can serve as a minibar. The desired aim is of course that of enhancing the passenger experience during the flight with more comfort and more conviviality.

By way of example, patent FR3095190, held by the applicant, describes a passenger suite comprising a convertible seat unit, a sofa, an extra seat unit, a console and a sliding access door. The sofa includes a first corner, a middle section and a second corner. The convertible seat unit and the extra seat unit are laterally adjoined respectively to the first corner and the second corner so that said seat units are facing, and the middle section of the sofa can be converted into a tray.

This passenger suite comprises a single screen positioned above the level of the backrests of the sofa and the extra seat unit, the latter not being convertible into a bed such that said backrests does not need to be of a necessary length. On the other hand, the backrest of the convertible seat unit necessarily has to be a certain length making it higher than the level of the screen positioned opposite.

Thus, it is not possible to dispose a second screen above the convertible seat unit (that of the main passenger) intended for a person sitting across from the main passenger, while ensuring an optimal angle of viewing comfort.

Another problem relates to the level of comfort of the chair. Aircraft passenger chairs can be used for daytime flights, during which the passenger will want to work, eat and/or relax, and for nighttime flights, during which the passenger will want to sleep. Preferably, such a chair should be able to offer comfortable positions for all these activities, while being capable of complying with dimensional constraints related to its surroundings.

Another problem relates to the appearance of offsets between the different sections of the chair during its conversion, resulting in non-functional spaces into which the passenger may drop their personal possessions: space behind the backrest, gap between the seat section and the backrest, etc.

Finally, in prior solutions, when it is necessary to restrict the size of a section of the seat, it is customary to use foldable sections such as leg rests and headrests.

However, folding a flexible section always causes the appearance of a stack that is thick, bulky and unsightly.

Document US2016052633, with reference to FIG. 1, describes a passenger module intended for an aircraft cabin, said module comprising a seat F arranged facing a bench B convertible into a bed (of the "sofa bed" type). A screen is placed above the backrest of the bench, facing the chair F. Due to the limited space between the chair and the bench, the chair cannot be converted into a bed. Hence, this solution proposes that the bench be convertible widthwise so that its seat section and its backrest can have small widths individually but a sufficient overall width to form a reclining surface.

SUMMARY

The present disclosure aims to overcome all or some of the drawbacks of the prior art disclosed hereinabove by providing an ergonomic sofa solution complying with dimensional constraints in an aircraft cabin arrangement.

An aim of the disclosure is therefore that of providing a sofa with a particular kinematic mechanism so that it can be converted between its two positions (sitting and reclining) despite the presence of dimensional constraints.

The particular kinematic mechanism described in the present disclosure is not mandatory. Other solutions can arrive at the same technical effect regarding compliance with dimensional constraints.

Another aim of the disclosure is that of providing an innovative alternative to existing arrangements.

To this end, the present disclosure relates to a sofa for a passenger transport vehicle such as an aircraft, including a seat section, a backrest and a structure supporting them, said sofa being convertible into at least two positions each having a total usable surface by the passenger: a sitting position wherein the backrest is upright with respect to the seat section and a reclining position wherein the backrest is folded down in the same plane with respect to the seat section; said seat section having a sufficient length to allow a passenger in the sitting position to fully extend their legs. This sofa is remarkable in that in the sitting position, the backrest is partially stored beneath the seat section in a space of the structure, such that the total usable surface area in the sitting position is less than the total usable area in the reclining position.

Thus, part of the backrest "disappears" beneath the seat section when the sofa is in the sitting position, allowing said backrest to fit beneath a limited height, beneath an ideally positioned screen for example. When the sofa is in the reclining position, the backrest is restored to its full length so that the passenger has a maximum reclining surface area.

According to a particularly advantageous aspect, the support structure is mounted movable in translation along a longitudinal direction, actuating the seat section and the backrest with it, and the backrest is mounted movable both in translation, along its own longitudinal direction when it is upright in the sitting position, and in rotation about a transverse axis located at a junction between the seat section and the backrest.

The translation of the structure moves the whole sofa parallel with the floor on which it is mounted, in order to allow a clearance of the backrest, in particular with respect to a screen to be positioned just above it, and the upward translation of said backrest to initiate its transfer to the reclining position.

This particular kinematic mechanism thus avoids any folding of the flexible surfaces of the sofa.

More particularly, the movements of translation of the structure for moving the sofa forward and back, of separate translation of the backrest for raising and lowering it, and of rotation of said backrest for folding it down and setting it upright, are independent, the sofa comprising an actuator for each of these movements, in other words one actuator per movement.

According to one aspect, the rotational movement of the backrest is carried out by means of a circular rack connecting said backrest to the structure and making it possible to offset the axis of rotation of the backrest at the junction with the seat section.

The axis of rotation is thus a notional axis merged with a transverse junction line between the seat section and the backrest.

According to a preferred aspect, the length of the backrest is shorter than the length of the seat section, giving the sofa a chaise longue shape adapted for relaxation of the passenger with their legs fully extended.

According to one aspect of the disclosure, the seat section and the backrest comprise respectively rear and front lateral faces, intended to be adjoined in the reclining position of the sofa, said rear lateral face and said front lateral face being inclined respectively with respect to the top surface of the seat section by an angle of less than 90° and with respect to the top surface of the backrest by an angle greater than 90°, the sum of the two angles being equal to 180°.

This optimizes the junction to minimize the gap that may be created between the seat section and the backrest and through which the passenger's personal items may fall.

The present disclosure also relates to a compartment for a passenger transport vehicle such as an aircraft, comprising at least an amenity console (storage, minibar, drinks tray, etc.) and a display screen, and further comprising a sofa as described, said screen being positioned above the backrest of the sofa.

According to a fundamental aspect of the disclosure, the screen is placed at a height from the seat section when the sofa is in the sitting position, said height being less than the length of the backrest, the excess length of said backrest being stored beneath the seat section, in part in the space provided in the structure.

Indeed, the position of the screen is set for reasons of visual comfort of a passenger sitting in an extra seat unit across from the sofa.

According to one aspect, the compartment further comprises an extra chair placed across from and opposite the sofa.

Finally, the present disclosure also relates to an airliner, comprising at least one compartment as described.

The fundamental concepts of the disclosure having been disclosed hereinabove in their most elementary form, other details and features will become more apparent upon reading the following description with reference to the appended drawings, giving, by way of non-limiting example, an aspect of a convertible aircraft sofa, in accordance with the principles of the disclosure.

BRIEF DESCRIPTION OF THE DRAWINGS

The figures are given purely by way of illustration for better understanding of the disclosure without limiting the scope thereof. The various elements may be shown schematically and are not necessarily to scale. In the set of figures, identical or equivalent elements bear the same numerical reference.

Thus, it is illustrated in.

DETAILED DESCRIPTION

It should be noted that certain technical elements well known to those skilled in the art are recalled herein to avoid any insufficiency or ambiguity in the understanding of the present disclosure.

In the aspect described hereinafter, reference is made to a convertible chair, to the particular kinematic mechanism, mainly intended to be arranged under dimensional constraints in a higher class aircraft compartment. This non-limiting example is given for a better understanding of the disclosure and does not exclude use of the chair in other passenger transport vehicles offering the required level of comfort.

Hereinafter in the description, the term "convertible" means the ability of a passenger chair to be configured in at least two functional positions: a sitting position wherein the passenger can be normally seated; and a reclining position wherein the passenger can be fully reclined. The term "compartment" means a private space within the cabin, configured to accommodate one or more passenger seat units. This space can include specific fittings such as storage, comfort elements and entertainment facilities intended for passengers.

Figure 1:
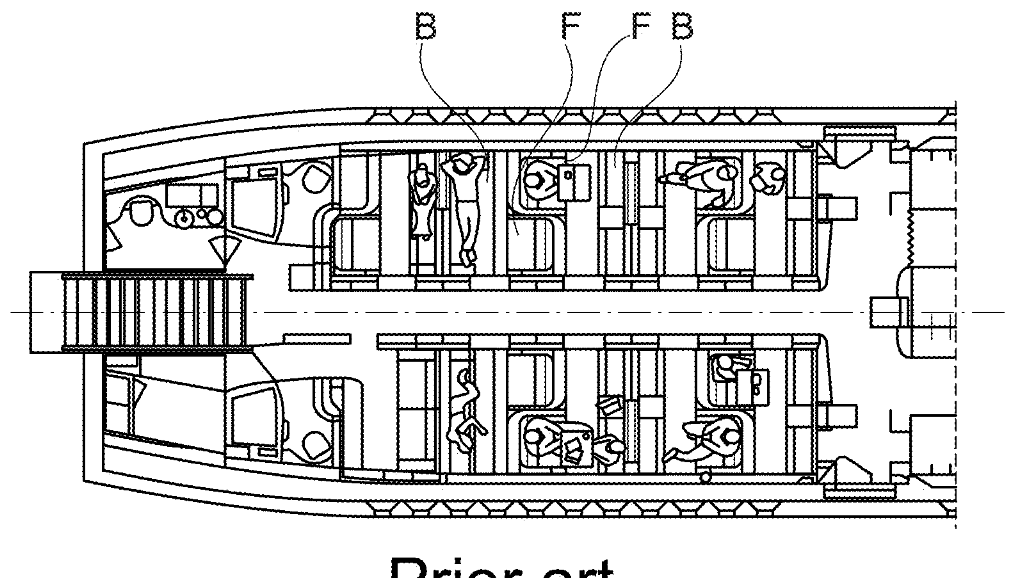
FIG. 1: (already cited) prior art arrangement with compartments comprising a convertible bench and a chair.
Figure 2:
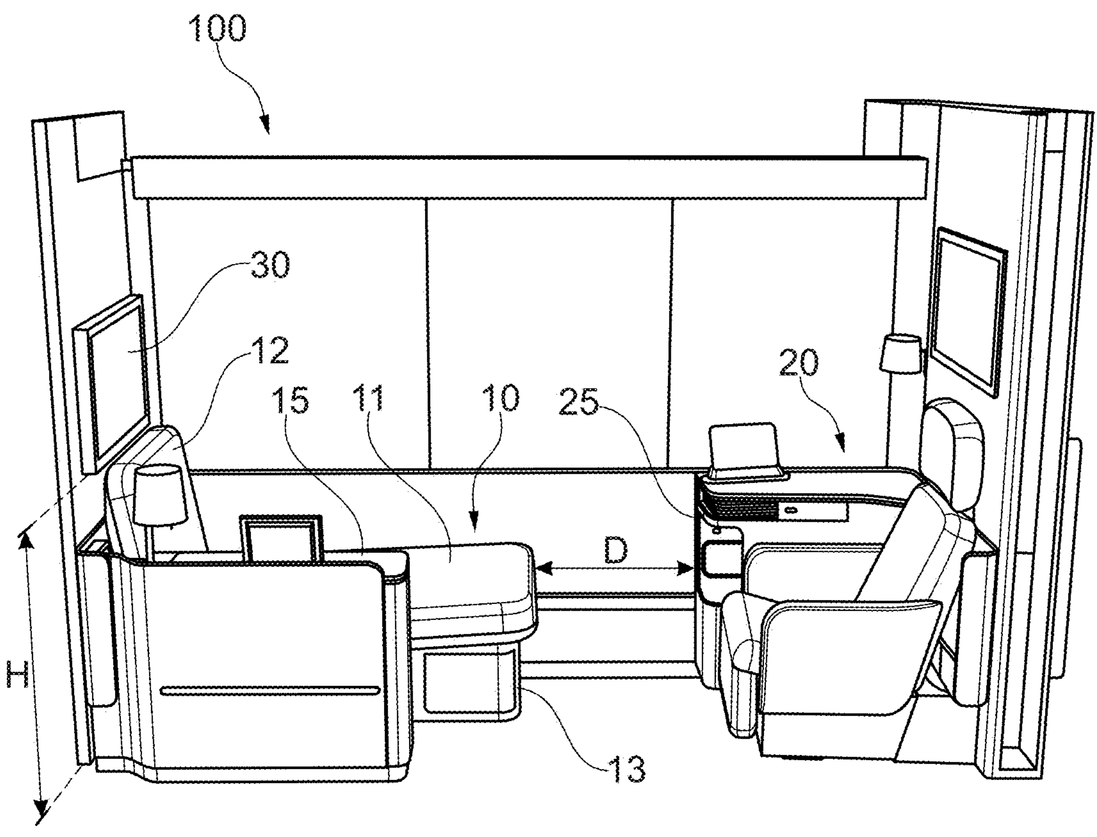
FIG. 2: a perspective view of a sofa according to one aspect of the disclosure, placed in a first class compartment of an aircraft.

FIG. 2 shows a passenger compartment 100, comprising a first convertible chair 10, or sofa, and a second different convertible chair 20 arranged facing the first. The sofa 10, unlike the second chair 20 of conventional design, includes an extra-long seat section 11 to allow a passenger "relaxation" position, wherein the passenger's legs are fully extended along said seat section.

The sofa 10 includes a backrest 12 against which the passenger can lean when in the "relaxation" position.

The sofa 10 includes a structure 13 supporting the seat section 11 and the backrest 12, said structure being capable of being attached to a floor in a sliding manner.

The sofa 10 is convertible into a bed and, to this end, has two positions: a sitting position, known in the jargon as the upright position, wherein the passenger is seated with their legs extended thanks to the large size of the seat section 11 which gives it a chaise longue shape; and a reclining position wherein the seat section 11 and the backrest 12 are substantially coplanar along a plane substantially parallel with the aircraft floor.

Figure 3A:
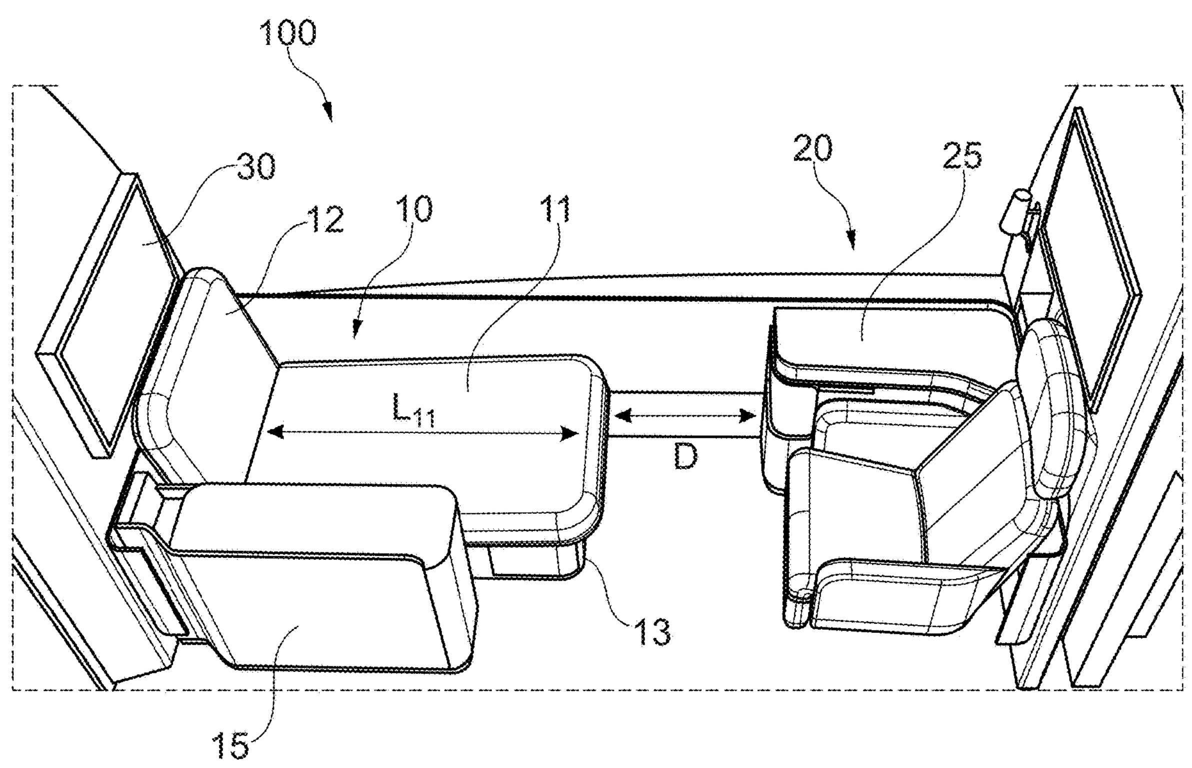
FIG. 3*a*: a plunging perspective view of the sofa in the sitting position.
Figure 3B:
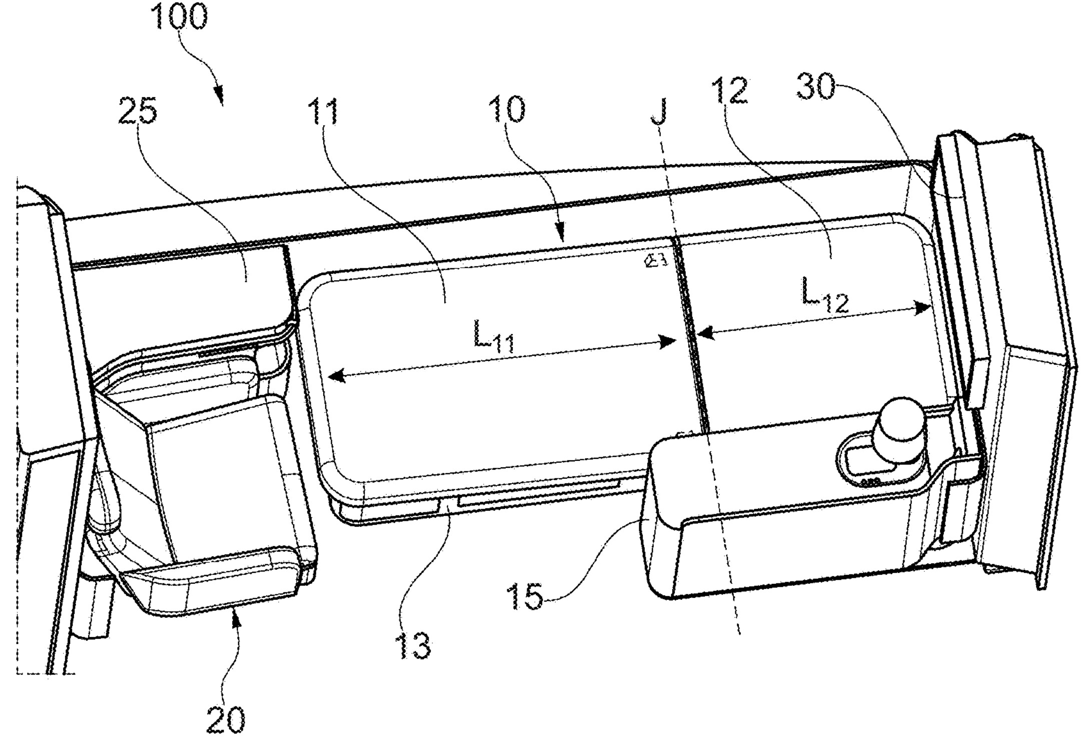
FIG. 3*b*: a plunging perspective view, in the inverted orientation with respect to FIG. 3*a*; of the sofa in the reclining position.

FIG. 3*a* and FIG. 3*b* respectively show the sofa 10 in the sitting position and in the reclining position.

The seat section 11 and the backrest 12 of the sofa 10 have dimensions adapted to occupy all the space available in front of the second chair 20, when said sofa is in the reclining position.

More specifically, a distance D remaining between the front edge of the seat section 11 and a console 25 associated with the second chair 20 when the sofa 10 is in the sitting position as shown in FIG. 2, is covered almost entirely when said sofa is in the reclining position as shown in FIG. 3*b*.

The empty space extending along this distance D is filled by the seat section 11 of the sofa 10 when the latter is in the reclining position. For this purpose, and taking into account the length $L_{11}$ of the seat section 11, the backrest 12 necessarily has a sufficient length $L_{12}$ for said backrest and seat section to occupy all the space available in the reclining position.

Because the length $L_{12}$ of the backrest 12 is defined, the latter is configured to fit beneath a screen 30 fastened at a height H from the floor. The height H separates the aircraft floor and the bottom side of the screen 30, the latter having a regular rectangular shape.

Indeed, in the particular industrial context of the disclosure, the height H of the screen and the distance D are set. The sofa 10 is therefore designed to move with its two dimensional constraints. On the one hand, the sofa 10 must be able to occupy all the space available in front of the second chair 20 in order to ensure the greatest possible reclining surface area. On the other, the backrest 12 of the sofa 10, which has a necessary length for the first function, must be able to fit beneath the screen 30 when the sofa 10 is in the sitting position without said backrest concealing any part of the screen from a passenger of the chair 20 facing it, in the knowledge that the length $L_{12}$ of the backrest is significantly greater than a residual height Hr existing between the top surface of the seat section 11 and the bottom side of the screen 30, as shown in FIG. 4.

Figure 4:
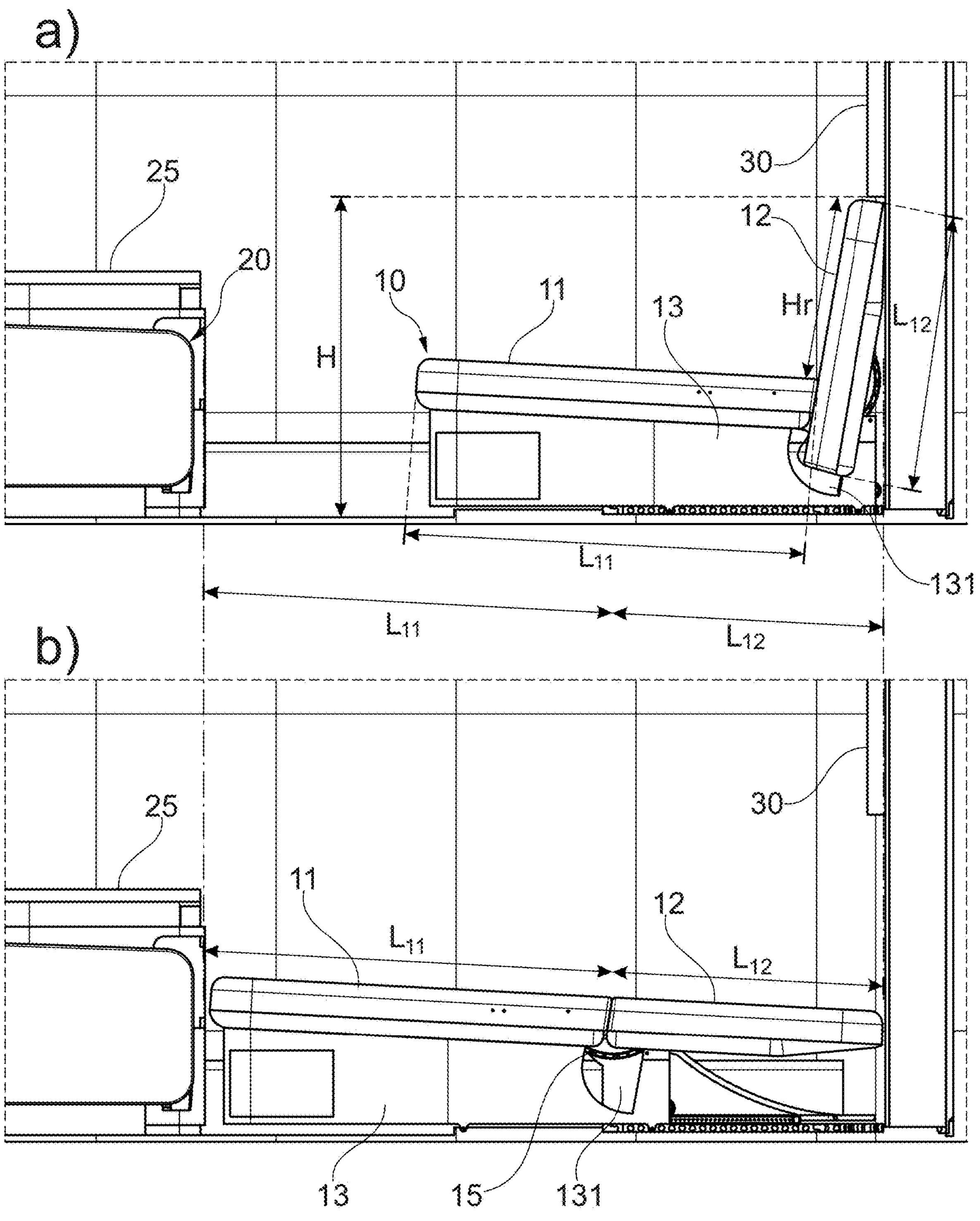
FIG. 4: a side view of the sofa in its two positions, sitting (a) and reclining (b), showing the dimensional constraints of the surroundings.

FIG. 4 makes it possible to view these different dimensional constraints in the two positions of the sofa 10.

In (a), the sofa 10 is in the sitting position. In this position, the screen 30 is at the residual height Hr with respect to the backrest 11. The residual height Hr is significantly less than the length $L_{12}$ of the backrest 12. Thus, the backrest 12 is partially stored beneath the seat 11 so as not to be placed in front of the screen 30. More particularly, a bottom section of the backrest 12 is positioned in a space 131 provided at the rear of the structure 13. Consequently, the top side of the backrest 12 reaches just below the screen 30, almost flush with the bottom side of said screen.

Therefore, in the sitting position of the sofa 10, a portion of the backrest 12 is beneath the top surface of the seat section 11, said portion extending along a length equal to the difference ($L_{12}$−Hr). This difference being greater than the thickness of the seat section 11, it was necessary to have the space 131 in the body of the structure 13.

In (b), the sofa 10 is in the reclining position, after a complete conversion. In this position, the top surfaces of the seat section 11 and the backrest 12 are in the same plane, thus forming a reclining surface occupying the entire space available between the wall whereon the screen 30 is fastened and the console 25 of the second chair 20. Along the longitudinal direction of the reclining surface, the space available extends along a distance substantially equal to the sum of the lengths of the seat section 11 and the backrest 12, ($L_{11}+L_{12}$), as represented in FIG. 4.

As described hereinafter, the sofa 10 moves from the sitting position (a) to the reclining position (b) with a particular kinematic mechanism wherein the seat section 11 moves forward and the backrest 12 moves up to clear the space 131 before folding down horizontally.

Figures 5A, 5B, 5C:
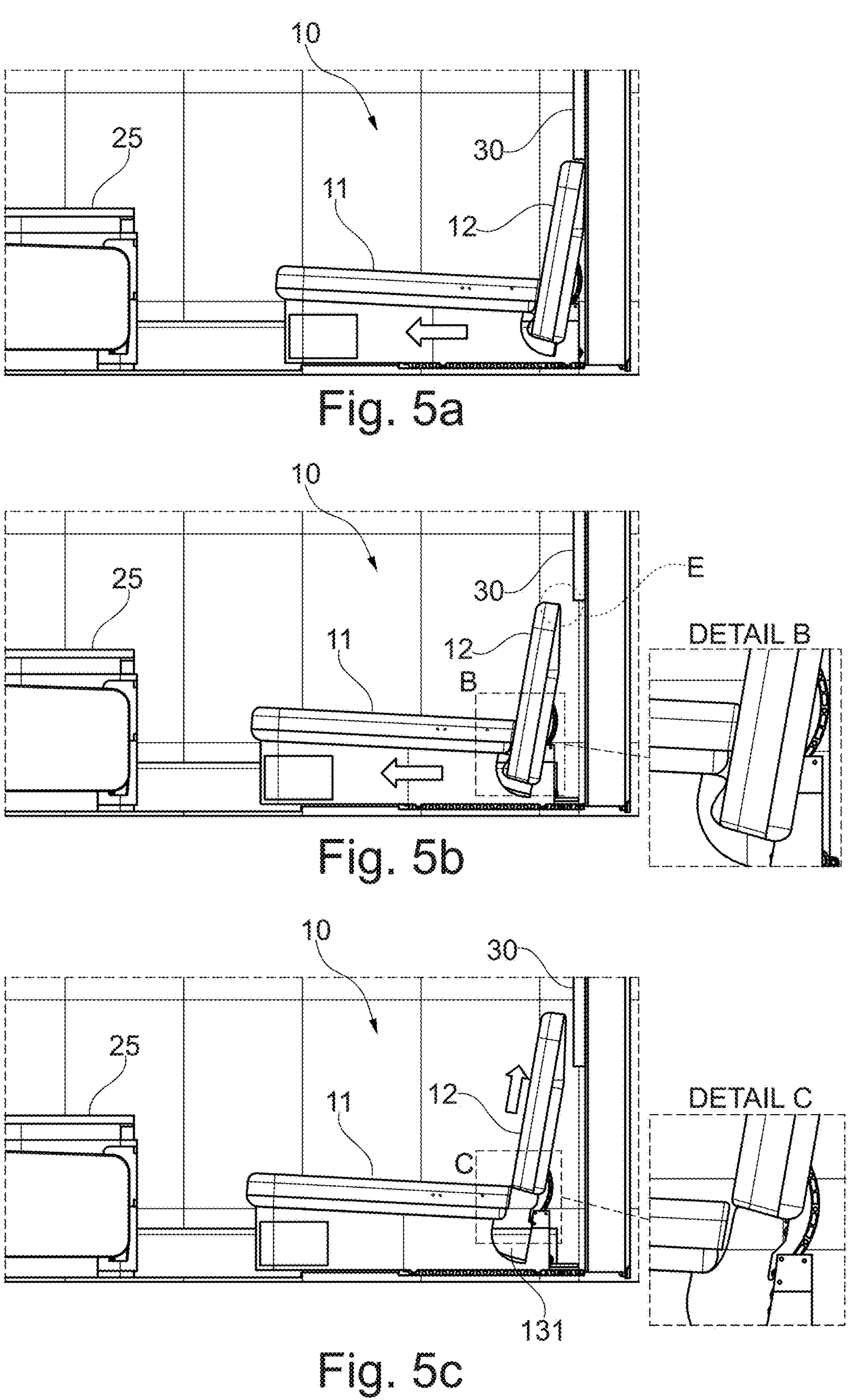
FIG. 5*a*: the sofa in the sitting position, at the start of conversion.
FIG. 5*b*: the sofa after a first overall translation to move the backrest away from the screen positioned above it.
FIG. 5*c*: the sofa with the backrest moved upward in translation.
Figure 5D:
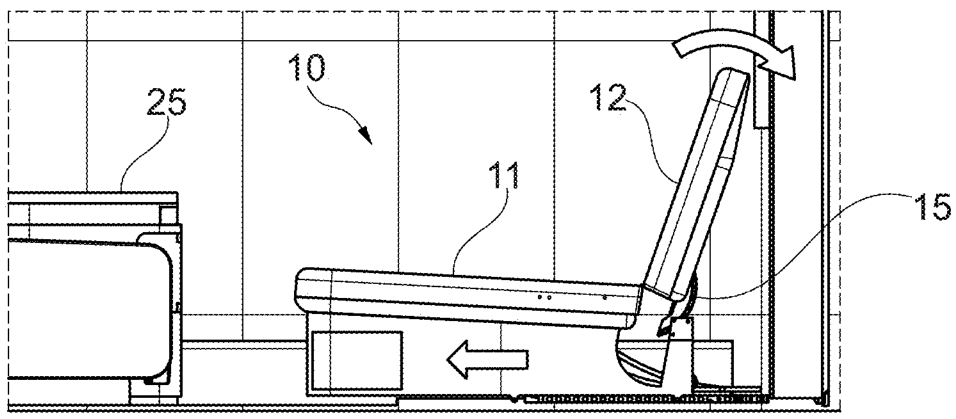
FIG. 5*d*: the sofa during the overall translation and rotation of the backrest.
Figure 5E:
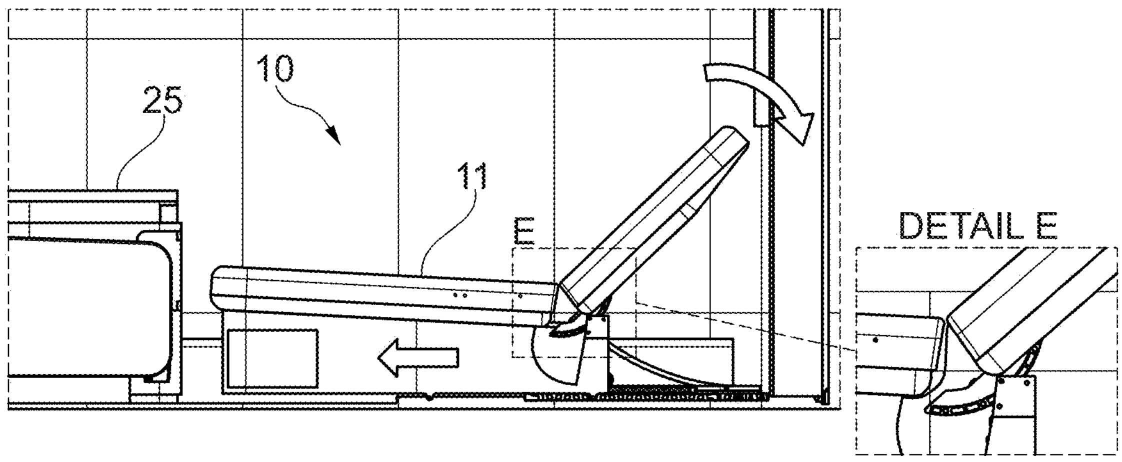
FIG. 5*e*: the sofa in a position following that of FIG. 5*d;*
Figure 5F:
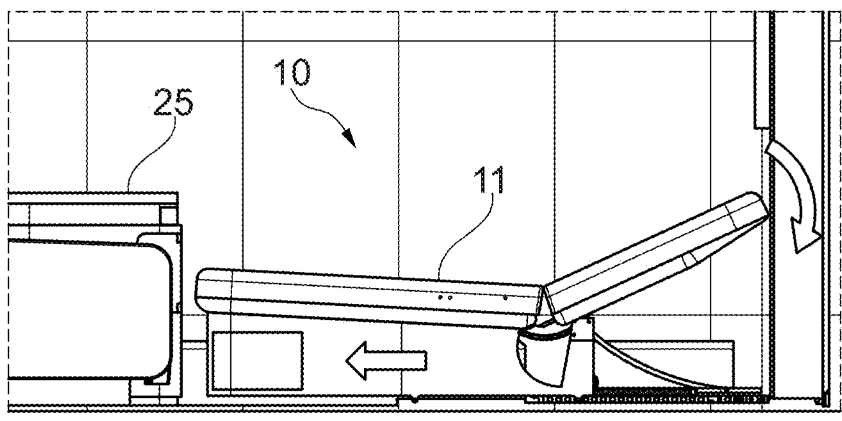
FIG. 5*f*: the sofa in a position following that of FIG. 5*e;*
Figure 5G:
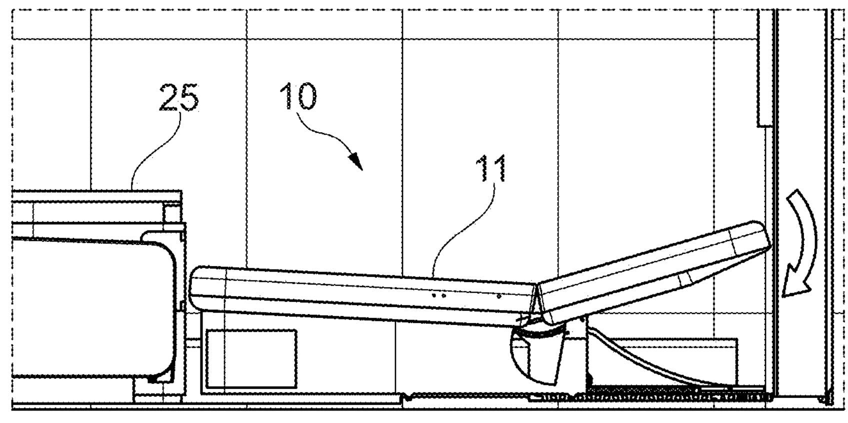
FIG. 5*g*: the sofa at the end of translation and with the backrest in rotation.
Figure 5H:
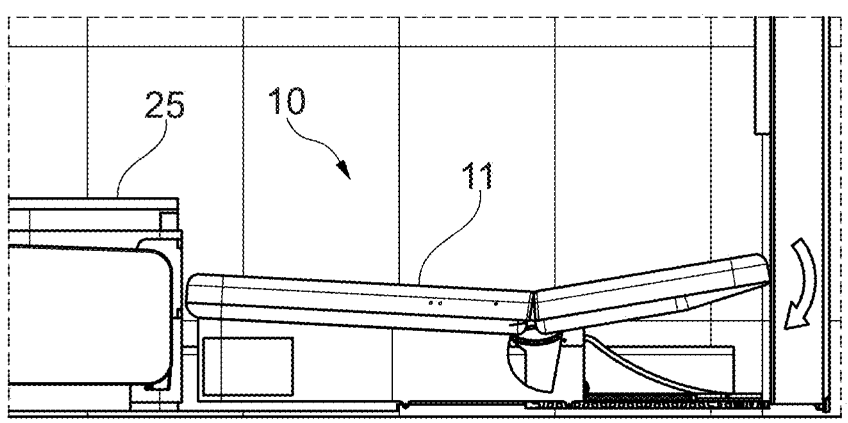
FIG. 5*h*: the sofa in a position following that of FIG. 5*g;*
Figure 5I:
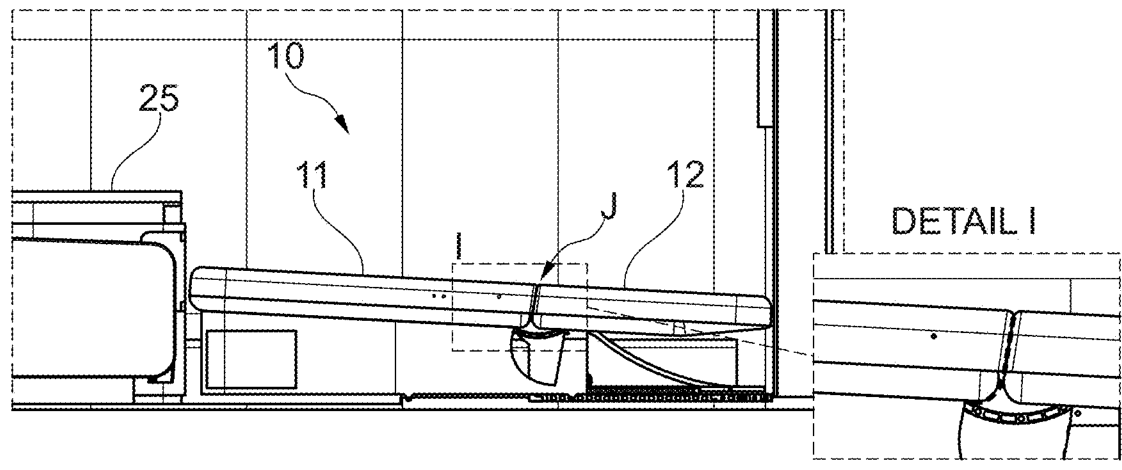
FIG. 5*i*: the sofa in the final reclining position, at the end of conversion.

FIGS. 5*a* to 5*i* show consecutive steps of converting the sofa 10 between its sitting position, shown in FIG. 5*a*, and its reclining position shown in FIG. 5*i*.

The sofa 10 starts by moving completely forward, parallel with the floor, as shown in FIGS. 5*a* and 5*b*. This translation continues until the backrest 12 is sufficiently clear of the screen 30 so that it can move upward.

FIG. 5*c* shows the backrest 12 moved upward, thus arriving via its bottom side at the seat section 11. In this step, the backrest 12 passes temporarily in front of the screen 30.

FIG. 5*d* then shows the start of the rotation of the backrest 12, as the whole sofa 10 continues to move forward.

This composite movement, of translation of the sofa 10 and of rotation of the backrest 12, continues progressively and continuously as shown in FIGS. 5*e* and 5*f*, until the seat section 11 arrives at its final position shown in FIG. 5*g*.

The rotation of the backrest 12 is performed by means of a circular rack 15 making it possible to offset the axis of rotation of the backrest on the junction line J between the seat section 11 and the backrest 12. Indeed, the rack 15 is fastened between the backrest 12 and the structure 13 and makes it possible to rotate said backrest about a notional axis merging with the junction line J, so that no void is created during the rotation of the backrest.

When the seat section 11 is in its final reclining position, only the backrest 12 continues its rotation to transfer completely and align with said seat section to form the reclining surface.

This final phase of rotation of the backrest 12, with the seat section 11 stationary in its final position, is shown in FIGS. 5*g* to 5*i*.

Finally, FIG. 5*i* shows the final configuration of the reclining position of the sofa 10, wherein the top surfaces of the seat section 11 and the backrest 12 are substantially coplanar and moved close together so as to prevent the presence of a gap at the junction line J.

Indeed, the improvement of the junction between the seat section 11 and the backrest 12 is achieved thanks to a particular shape of their lateral faces intended to be in contact when the sofa 10 is in the reclining position.

Figure 6:
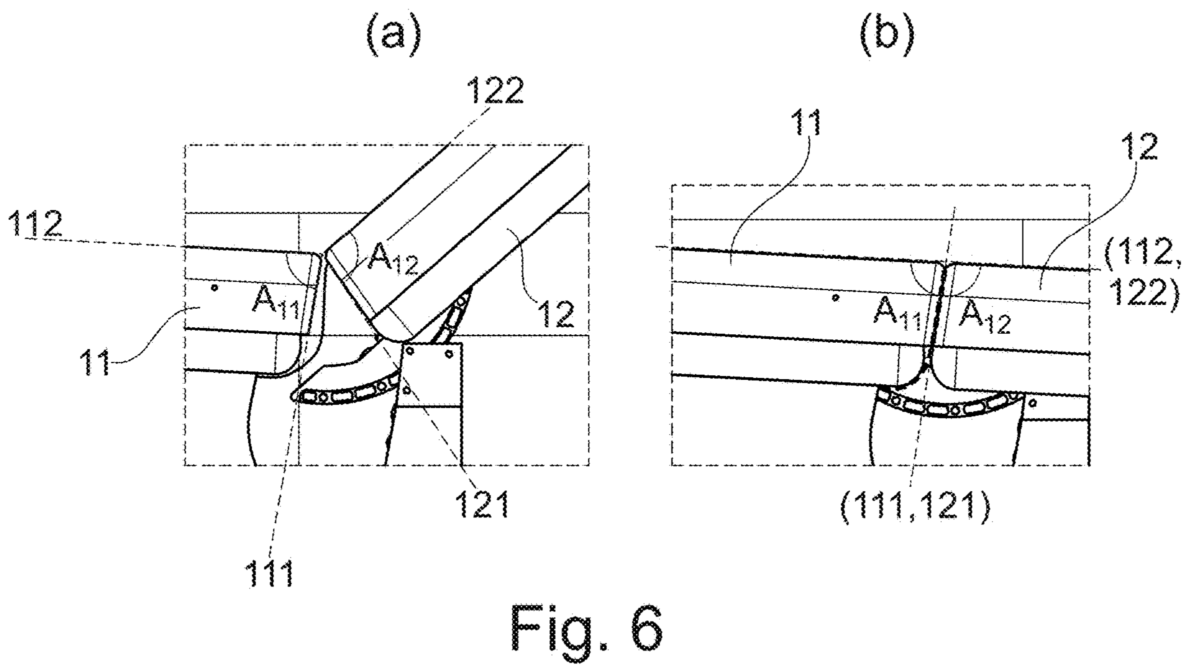
FIG. 6: a detailed view of the junction between the seat and the backrest, in the sitting position (a) and in the reclining position (b) of the sofa.

FIG. 6 shows the junction between the seat section 11 and the backrest 12 of the sofa, in an intermediate position during the conversion of the sofa in (a), and in the reclining position in (b).

The rear lateral face and the top face of the seat section 11 are respectively represented by the planes 111 and 112. Similarly, the front lateral face and the top face of the backrest 12 are respectively represented by the planes 121 and 122.

The front lateral face 121 of the backrest 12 is intended to come into contact with the rear lateral face 111 of the seat section 11 when the sofa is in the reclining position as shown in (b).

In order to limit the gap in the junction, the front lateral face 121 of the backrest 12 is positively inclined with respect to the top face 122 of said backrest, by an angle $A_{12}$ greater than 90°. On the other hand, the rear lateral face 111 of the seat section 11 is negatively inclined with respect to the top face 112 of said seat section, by an angle $A_{11}$ less than 90°.

So that the lateral faces 111 and 121 are perfectly adjoined in the reclining position of the sofa 10, the sum of the angles $A_{11}$ and $A_{12}$ is equal to 180°. This can be seen in FIG. 6 in configuration (b).

During its conversion from the sitting position to the reclining position or vice versa, the sofa executes a translational movement of the structure 13 for moving the whole sofa forward and back, a separate translational movement of the backrest 12 for raising and lowering it, and a rotational movement of said backrest for folding it down and setting it upright.

These three movements are independent and the sofa 10 comprises one actuator per movement.

Figure 7:
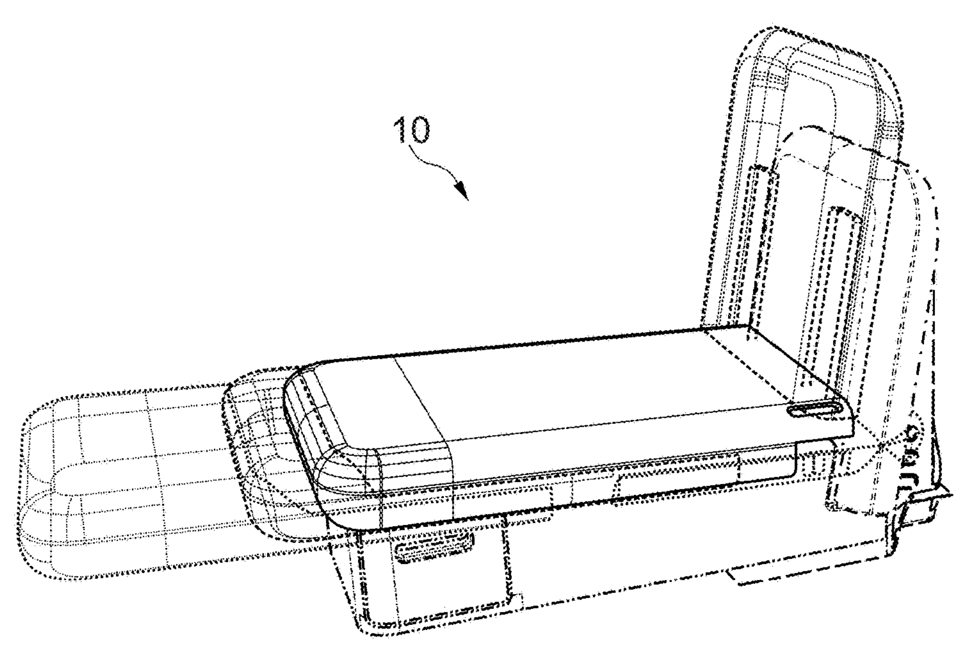
FIG. 7: an overlay of the sitting position, the reclining position and an intermediate conversion position wherein the backrest is raised.

FIG. 7 shows the overlaid end positions of the sofa 10: the sitting and reclining positions as well as an intermediate conversion position wherein the backrest is raised. This shows that the sofa 10 has a compact design and can be converted into a small space thanks to the kinematic mechanism described hereinabove.

Figure 8:
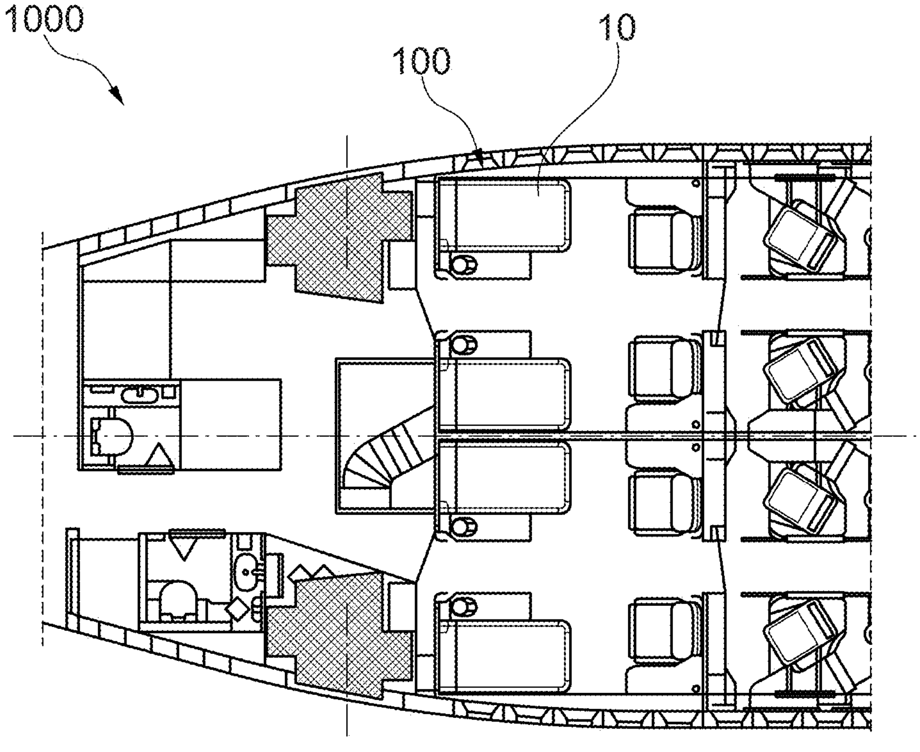
FIG. 8: a partial layout drawing of a cabin with compartments according to the disclosure.

FIG. 8 shows a partial layout drawing, or LOPA (layout of passenger arrangement), of an aircraft 1000 comprising several compartments 100. According to the exemplary aspect illustrated, the aircraft comprises two side compartments, separated by two adjoining central compartments.

It follows from the present description that certain non-essential elements of the sofa can be modified, replaced or removed without for all that falling outside the scope of the disclosure defined by the claims hereinafter.

What is claimed is:

1. A compartment for a passenger transport vehicle comprising:

at least an amenity console, a sofa including:

a seat section, a backrest having a length and a structure supporting the seat section and the backrest, said sofa being convertible into at least two positions each having a maximum usable surface area by a passenger: a sitting position wherein the backrest is upright with respect to the seat section and a reclining position wherein the backrest is folded down in a plane with the seat section; said sofa being characterized in that in the sitting position, the backrest is partially stored beneath the seat section in a space within the structure, such that the maximum usable surface area in the sitting position is less than the maximum usable surface area in the reclining position, wherein the structure is movably mounted so as to be movable in translation along a longitudinal direction such that the seat section and the backrest actuates with the structure, wherein said seat section has a length to allow the passenger in the sitting position to fully extend passenger's legs, and wherein said backrest is movably mounted so as to be movable both in translation, along a longitudinal direction of the backrest when the backrest is upright in the sitting position, and in rotation about an axis of rotation located at a junction between the seat section and the backrest; and a screen positioned above the backrest of the sofa, wherein the screen is positioned at a height from the seat section when the sofa is in the sitting position, said height less than the length of the backrest.

2. The compartment according to claim 1, wherein the translation movement of the structure for moving the sofa forward and back, the translation movement of the backrest for raising and lowering the backrest, and rotational movement of said backrest for folding the backrest down and setting the backrest upright, are independent of each other, and said sofa comprising one actuator per movement.

3. The compartment according to claim 1, wherein the rotational movement of the backrest is carried out by means of a circular rack connecting said backrest to the structure and making the means of a circular rack possible to offset the axis of rotation of the backrest at the junction with the seat section.

4. The compartment according to claim 1, wherein the length of the backrest is less than the length of the seat section, giving the sofa a chaise longue shape.

5. The compartment according to claim 1, wherein the seat section and the backrest comprise respectively rear and front lateral faces configured to be adjoined in the reclining position of the sofa, said rear lateral face and said front lateral face inclined respectively with respect to a top surface of the seat section at an angle of less than 90° and with respect to a top surface of the backrest at an angle greater than 90°, a sum of two angles equal to 180°.

6. The compartment according to claim 1, further comprising an extra chair placed across from and opposite the sofa.

7. An airliner comprising at least one of the compartment according to claim 1.

* * * * *